(12) United States Patent
Phillips

(10) Patent No.: US 8,631,535 B2
(45) Date of Patent: Jan. 21, 2014

(54) ARTICULATED, MULTIPLE CLEANING SURFACE CLEANING TOOL AND METHOD

(76) Inventor: Brian Phillips, San Antonio, TX (US)

(*) Notice: Subject to any disclaimer, the term of this patent is extended or adjusted under 35 U.S.C. 154(b) by 749 days.

(21) Appl. No.: 12/547,931

(22) Filed: Aug. 26, 2009

(65) Prior Publication Data

US 2011/0047732 A1 Mar. 3, 2011

(51) Int. Cl.
*A47L 13/12* (2006.01)

(52) U.S. Cl.
USPC .............................. 15/118; 15/144.2; 15/144.4

(58) Field of Classification Search
USPC ............................ 15/118, 144.4, 210.1, 144.2
See application file for complete search history.

(56) References Cited

U.S. PATENT DOCUMENTS

| | | | | |
|---|---|---|---|---|
| 5,477,582 A | * | 12/1995 | Yamashita | 15/231 |
| 5,937,471 A | * | 8/1999 | Liao | 15/111 |
| 6,298,517 B1 | * | 10/2001 | McKay | 15/228 |
| 6,705,792 B2 | * | 3/2004 | Smith | 401/283 |
| 7,698,773 B2 | * | 4/2010 | Sotelo | 15/210.1 |
| 7,716,790 B2 | * | 5/2010 | Newman et al. | 16/429 |
| 7,841,040 B2 | * | 11/2010 | Strunk et al. | 15/118 |
| 7,854,035 B2 | * | 12/2010 | Gullicks et al. | 15/147.1 |
| 8,065,775 B2 | * | 11/2011 | Cameneti et al. | 15/228 |
| 2004/0088813 A1 | * | 5/2004 | Cox | 15/210.1 |
| 2007/0220693 A1 | * | 9/2007 | Billig et al. | 15/104.94 |

* cited by examiner

*Primary Examiner* — Randall Chin
(74) *Attorney, Agent, or Firm* — Katarzyna Brozynski; David G. Henry

(57) ABSTRACT

An extendable cleaning tool with multiple, cleaning, agitating and wiping implements, each being simultaneously in ready-for-use configuration and proximity during a waterless cleaning operation, requiring axial rotation of the tool's pole for positioning for use and without requiring multiple repositioning of the tool's distal end between the user's location and the proximity of a to-be-cleaned surface area during waterless cleaning of that surface area.

3 Claims, 4 Drawing Sheets

ARTICULATED, MULTIPLE CLEANING SURFACE CLEANING TOOL AND METHOD

BACKGROUND OF THE INVENTION

1. Field of the Invention

The present invention relates to cleaning tools and methods for cleaning hard to reach surfaces.

2. Background Information

The Environmental Protection Agency (EPA) has mandated tougher penalties for individuals and companies that do not comply with the correct procedures when dealing with the environment. For example, the laws and regulations of discharging wastewater into the storm drains have become more strict.

A serious problem associated with traditional water-based vehicle (e.g., car, boat or plane) washing is the harm to the environment with petroleum-based products and detergents—more specifically soaps and surfactants—and the contaminants, e.g., oil, grease, exhaust soot, hydraulic fluid, etc., that are being washed off the vehicle. All of these contaminants and detergents are being washed down the drain. Typically, street drains flow directly into their nearest river, so the detergents and other contaminants from the vehicle washing are harming the environment and wildlife, as they are not biodegradable.

Generally, storm drains are owned by the City, so every City must approve of the discharge of water. All storm drains lead to state rivers and creeks. Therefore, the EPA and one or more States have jurisdiction.

Dry washing is becoming more and more popular throughout the world for two primary reasons—to circumvent the need for any EPA or State involvement, and the need to conserve water, especially in areas with limited water recourses.

A dry wash is a technique used to wash a vehicle without the use of water (also called a waterless wash or dry cleaning) and without the attendant wastewater runoff. This technique uses a product that contains many different ingredients, including wetting agents, lubricants and protectants. With proper application, the product lifts dirt from the vehicle by emulsification.

The application process does not involve high pressure nor any extensive rubbing. It also does not require "soaking," or the use of a high volume of product. Generally, there are 3 steps involved: 1) spray a suitable cleaning compound product onto the to-be-cleaned surface (or a pad or cloth which will be used to clean the surface), 2) agitate the surface(s) with a damp pad (with or without cleaning solution applied), and 3) remove contaminant-laden cleaning solution with a second, dry pad. In order to clean high or hard to reach areas (which predominate in cases of larger aircraft, RV's, boats, trucks, and the like), a ladder, or a much more expensive hydraulic lift device is typically required.

Hydraulic lift devices are often unavailable, and ladders can, in the event of an all-to-frequent fall, be very dangerous to the user, as well as to the vehicle, plane or structure being cleaned. In fact, one of the most potentially hazardous, everyday tools—the common extension ladder or stepladder—sends more than 222,000 people to emergency rooms each year. "The number of emergency room visits from ladder-related injuries totals more than those for lawn mowers and home workshop saws combined," warns John Drengenberg, manager of Consumer Affairs at Underwriters Laboratories Inc. (UL), the not-for-profit product safety organization.

Currently, some consumers and professionals attempt to use a single padded pole for all waterless or dry wash products, the pad of which must: (1) be immediately removed before the cleaning solution dries, and (2) be quickly replaced with a "wipe off" pad (if such is to be used). In the time it takes to change the pad of a single padded pole, the dry wash product often will have dried, thereby making the over-all cleaning process much more time and labor-intensive. The only other alternative (little more effective and very time inefficient) is using multiple such devices.

Further still, existing devices with distally mounted cleaning pads that are in any meaningful way adaptable for use in cleaning such things as airplanes, RVs, trucks, and the like are lacking in any means for themselves assisting in accommodating varying orientations and/or contours of the surfaces which are to be cleaned. In other words, if a to-be-cleaned surface lies at a 45° angle relative to the horizontal, the conventional pole will require manipulation at the user end for properly aligning the cleaning pad with the surface for effective cleaning or drying. This alone exacerbates the danger, time consumption and user fatigue associated with current modes of cleaning, as users must "contort" themselves to varying degrees to effectively clean and dry the to-be-cleaned surfaces.

Despite all of the benefits of waterless or dry washing, optimal equipment for carrying out the process is currently absent from the marketplace.

SUMMARY OF THE INVENTION

In view of the foregoing, it is an object of at least one embodiment of the present disclosure to provide an improved extendable cleaning apparatus.

It is another object of at least one embodiment of the present disclosure to provide an improved extendable cleaning apparatus with two pads.

It is another object of at least one embodiment of the present disclosure to provide an extendable cleaning tool with multiple, cleaning, agitating and wiping implements, each being simultaneously in ready-for-use configuration and proximity during a waterless cleaning operation, requiring merely axial rotation of the tool's pole for positioning for use and without requiring multiple repositioning of the tool's distal end between the user's location and the proximity of a to-be-cleaned surface area during waterless cleaning of that surface area.

It is another object of at least one embodiment of the present disclosure to provide an extendable cleaning tool providing the just-described characteristics, and further providing mounting and support means for the mentioned multiple, cleaning, agitating and wiping implements that articulate for conforming, at least in part, to the contours and orientations of to-be-cleaned surface areas, thereby reducing required manipulation of the tool at the user end to accomplish such ends.

It is another object of at least one embodiment of the present disclosure to provide an extendable, multiple cleaning surface, articulatable cleaning tool for use in cleaning surfaces that are not within unaided reach of cleaning personnel (large airplanes, upper portions of RVs and trucks, large boats, and building surfaces, for example).

It is another object of at least one embodiment and mode of the present disclosure to provide an extendable, multiple cleaning surface, articulatable cleaning tool and associated method for cleaning surfaces that reduce time of such cleaning (compared to conventional equipment and methods), reduce the physical exertion required for such cleaning (compared to conventional equipment and methods), and reduces the hazards to personnel (compared to conventional equipment and methods).

In satisfaction of these and related objectives, at least one embodiment of the present disclosure provides an extendable cleaning tool with multiple, cleaning, agitating and wiping implements, each being simultaneously in ready-for-use configuration and proximity during a waterless cleaning operation, requiring merely axial rotation of the tool's pole for positioning for use and without requiring multiple repositioning of the tool's distal end between the user's location and the proximity of a to-be-cleaned surface area during waterless cleaning of that surface area. An embodiment of the present disclosure provides mounting and support means for the mentioned multiple, cleaning, agitating and wiping implements that articulate for conforming, at least in part, to the contours and orientations of to-be-cleaned surface areas, thereby reducing required manipulation of the tool at the user end to accomplish such ends. The tool and associated method for cleaning surfaces disclosed herein reduce the time of cleaning out-of-reach surfaces (compared to conventional equipment and methods), reduce the physical exertion required for such cleaning (compared to conventional equipment and methods), and reduces the hazards to personnel during such cleaning (compared to conventional equipment and methods).

DETAILED DESCRIPTION OF THE PREFERRED EMBODIMENT

Figure 1:
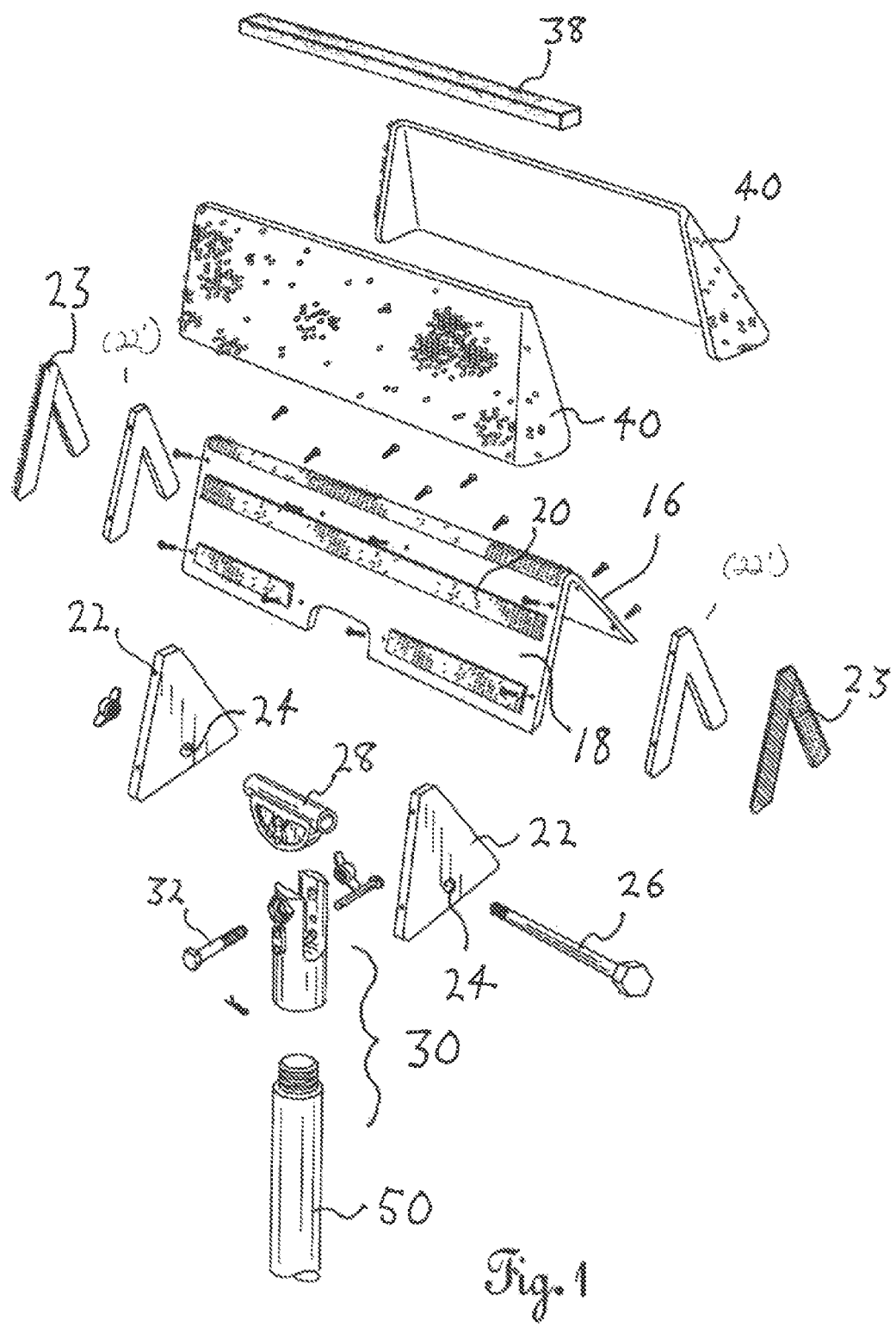
FIG. 1 is an exploded perspective view of the preferred embodiment of the extendable, multiple-cleaning implement, articulatable cleaning tool of the present disclosure.
Figure 2A:
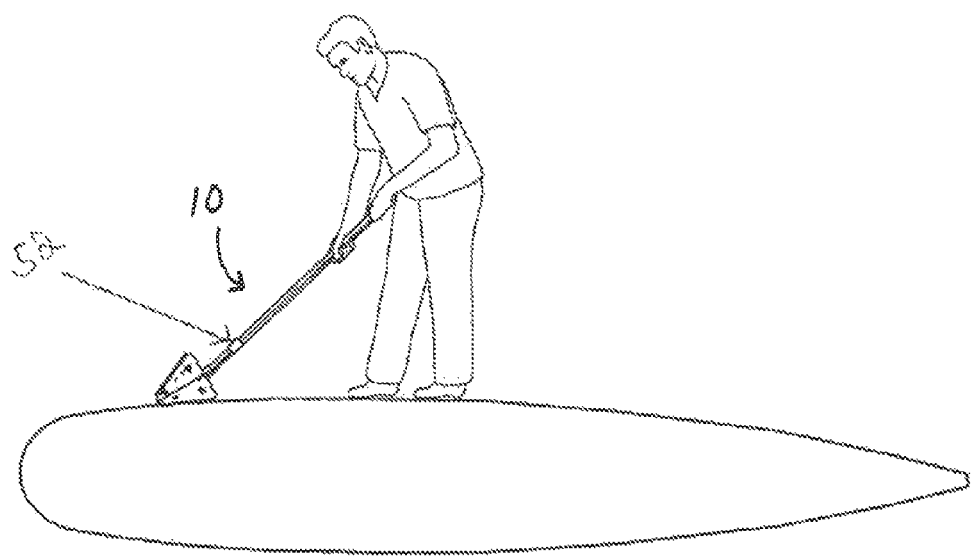
FIGS. 2a-2e are views depicting various modes of use of the herein disclosed tools and methods, in the depicted example for use in cleaning aircraft surfaces, and showing the articulation of the head portion of the tool during cleaning of surfaces of varying positions and orientations relative to the cleaning personnel.
Figure 2B:
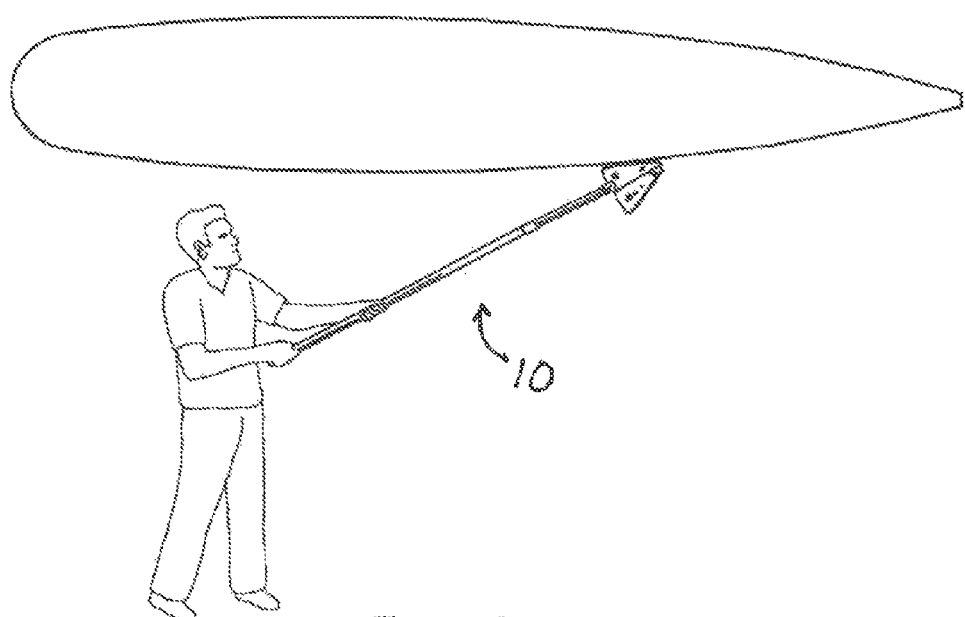
Figure 2C:
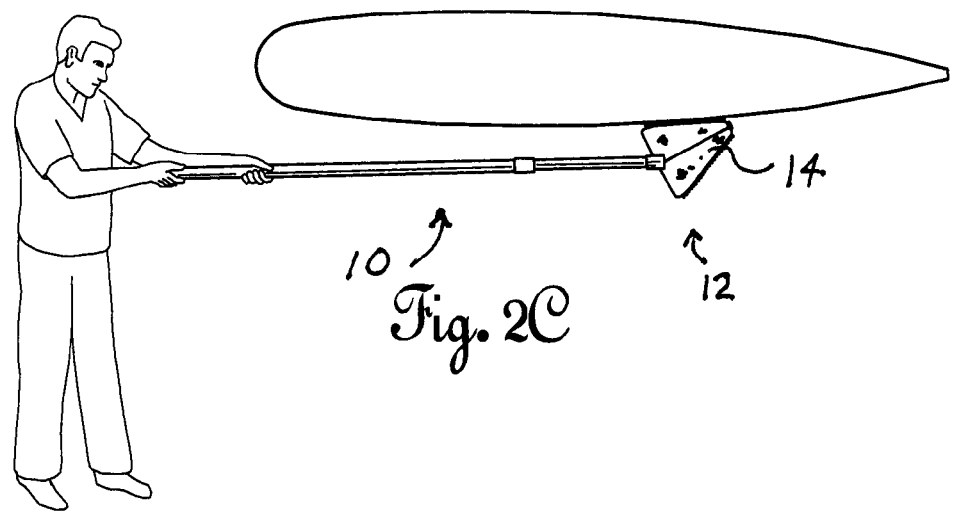
Figure 2D:
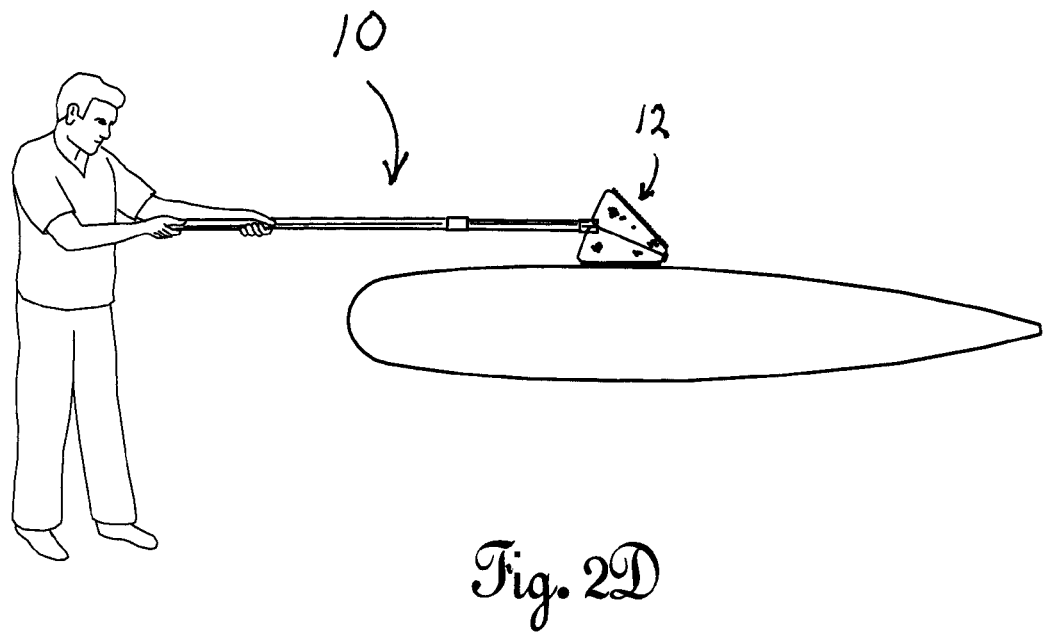
Figure 2E:
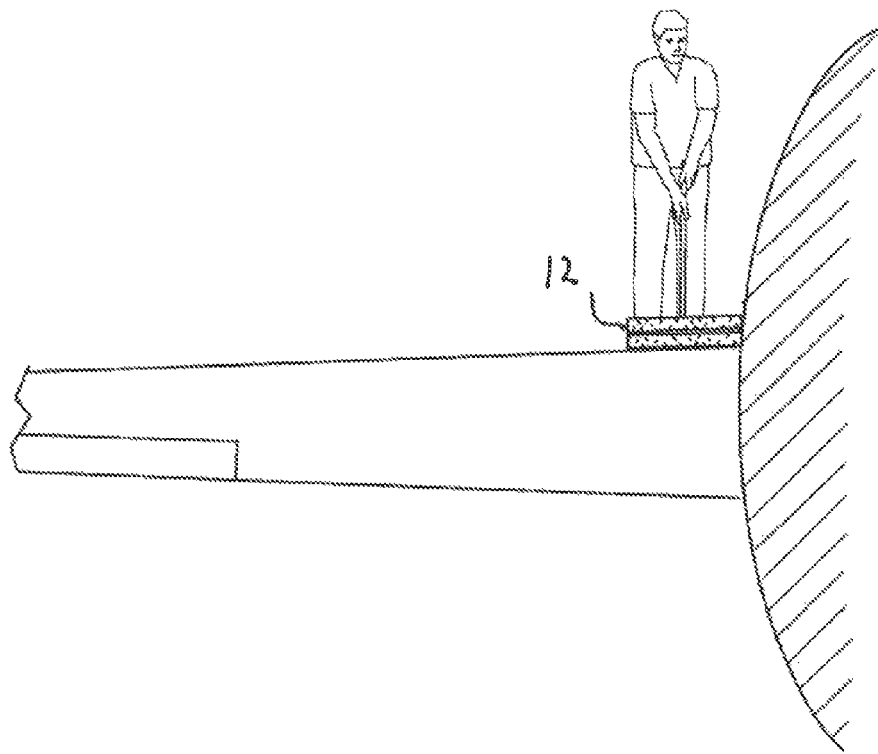

Referring to the drawings, a preferred embodiment of the extendable, multiple-cleaning implement, articulating head cleaning tool of the present disclosure (hereafter "cleaning tool") is identified generally by the reference numeral 10.

As shown particularly in FIG. 1, head portion 12 of cleaning tool 10 includes, when assembled for use, a substantially caret-shaped (in cross section) head structure 14 with first and second cleaning pad support faces 16 and 18. Cleaning pad support faces 16 and 18 include, in the preferred embodiment, VELCRO strips 20 ("bristle" or "matt", depending on the corresponding type installed on the to-be-described cleaning pads).

End caps 22 are affixed at either end of head structure 14 and each includes an axle hole 24 for receiving distal portions of axle 26 relative to which head structure 14 is free to pivot in one degree of freedom. Affixed to the outer surface of each end cap 22 are end cap support faces 22', which have VELCRO strips 23 ("bristle" or "matt", depending on the corresponding type installed on the to-be-described cleaning pads).

Axle carrier 28 telescopically receives axle 26 and is itself pivotally engaged with the distal end of pole assembly 30 for movement in a second degree of freedom by way of pivotal carriage by bolt 32 as understood by reference to FIG. 1.

Figure 3:
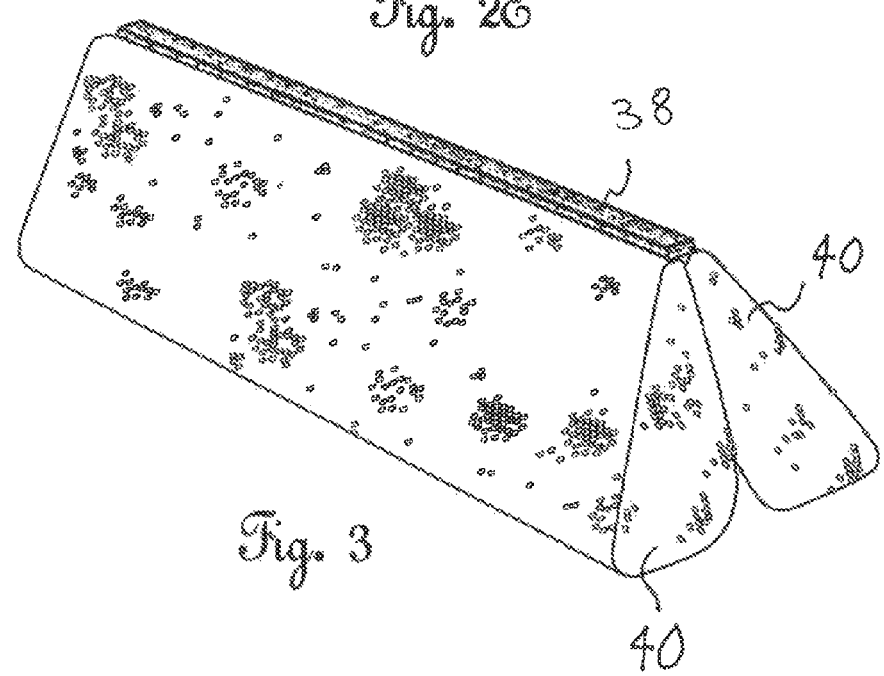
FIG. 3 is a perspective view of the head portion of the present tool with pads installed as for a cleaning operation.

For reversible application to first and second cleaning pad support faces 16 and 18 are provided first and second cleaning pads 40. Cleaning pads 40 are sized and shaped to overlie first and second cleaning pad support faces 16 and 18 and end caps support faces 22' (as shown in FIG. 3) and include corresponding VELCRO strips or other suitable surface(s) (not shown in the drawings) that are positioned for juxtaposition, respectively, with and reversible engagement with VELCRO strips 20 and 23.

By conventional design for telescopic poles for various uses, the pole portion 50 of pole assembly 30 is telescopic with conventional locking means 52 for securing pole portion 50 at a user-selected length. This feature permits optimal adjustment of the cleaning tool's length for cleaning surfaces of differing distances from a user's stance (as depicted in FIGS. 2a-2e).

Finally, a scouring pad 38 is affixed at the pinnacle of head portion 12. Scouring pad 38 is, in the preferred embodiment, configured of material such as that from which SCOTCH BRIGHT dish washing pads by 3M Company are made and is used for removing particularly "stubborn" dirt, grease, or debris. Pad 38 is attached to the outer surface of either of pads 40 by any expedient manner, and may be by VELCRO attachment generally as previously described.

The combination of the multiple cleaning/scouring surfaces (on each broad face of head member 12, as well as on each end, atop end caps 22), combined with the articulating head provides unparalleled cleaning utility and convenience when cleaning large vehicles and structures having multiple surfaces of varying orientations and shapes, many of which are out of reach of the unaided user.

No matter the orientation of a to-be-cleaned surface, so long as it is within reach (as facilitated by the extendable utility of the tool 10), a user can easily, and in most cases, safely perform waterless cleaning operations by simply: (1) performing the first cleaning solution application and scouring step principally through use of the first cleaning pad; and (2) rotate the cleaning tool 10 about its long axis to accomplish the second, wiping-away step using the second, opposite cleaning pad surface. In most case, the process is complete after these two simple steps. For angular junctions and the like, the pad portions that lie atop end caps 22 facilitate "reaching" into such areas for thorough cleaning. The scouring pad 38 further aids in cases of difficult-to-remove dirt, grease or other debris.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A waterless cleaning apparatus, comprising:
    an elongated cleaning head member having a first cleaning pad support face and a second cleaning pad support face, wherein said first cleaning pad support face and said second cleaning pad support face converge at an apex and form a generally V-shaped cross-section;
    a first end cap with a first end cap support face and a second end cap with a second end cap support face, wherein said first end cap and said second end cap attach to said cleaning head member such that said first end cap support face and said second end cap support face are oriented substantially parallel to each other, and said first end cap support face and said second end cap support face are further oriented such that said end cap support faces are substantially orthogonal to said first cleaning pad support face and said second cleaning pad support face;

a first cleaning pad sized and shaped to allow said first cleaning pad to cover said first cleaning pad support face plus part of said first end cap support face and part of said second end cap support face, and a second cleaning pad sized and shaped to allow said second cleaning pad to cover said second cleaning pad support face plus part of said first end cap support face and part of said second end cap support face, wherein said first cleaning pad and said second cleaning pad are configured for at least partially absorbing a liquid cleaning solution and scouring a to-be-cleaned surface;

a scouring pad attached at said apex of said cleaning head member; and a telescopic pole pivotally engaged with said cleaning head member at an engagement point located opposite said apex, such that there is relative movement between said telescopic pole and said cleaning head member in at least two degrees of freedom.

2. The apparatus of claim 1 wherein the planes of each respective surface of said first cleaning pad support face and said second cleaning pad support face lie, relative to each other, at an acute angle.

3. The apparatus of claim 2 wherein said acute angle is approximately 50 degrees.

\* \* \* \* \*